R. SMILLIE & C. H. BROOKS.
End-Gates for Wagons.

No. 141,602.

Patented August 5, 1873.

Witnesses.
Harry King.
W. W. Dodge.

Inventor.
Robert Smillie.
Chas. H. Brooks.
By their attys
Dodge & Son

UNITED STATES PATENT OFFICE.

ROBERT SMILLIE AND CHARLES H. BROOKS, OF VIRDEN, ILLINOIS.

IMPROVEMENT IN END-GATES FOR WAGONS.

Specification forming part of Letters Patent No. 141,602, dated August 5, 1873; application filed May 7, 1873.

*To all whom it may concern:*

Be it known that we, ROBERT SMILLIE and CHARLES H. BROOKS, of Virden, in the county of Macoupin and State of Illinois, have invented certain Improvements in End-Gates for Wagons, of which the following is a specification:

Our invention consists in hinging the rear end of one side of the wagon-body so that it may be swung outward to release the gate, and in fastening said hinged part by one of the tie-rods extending across the body, as usual.

Figure 1:
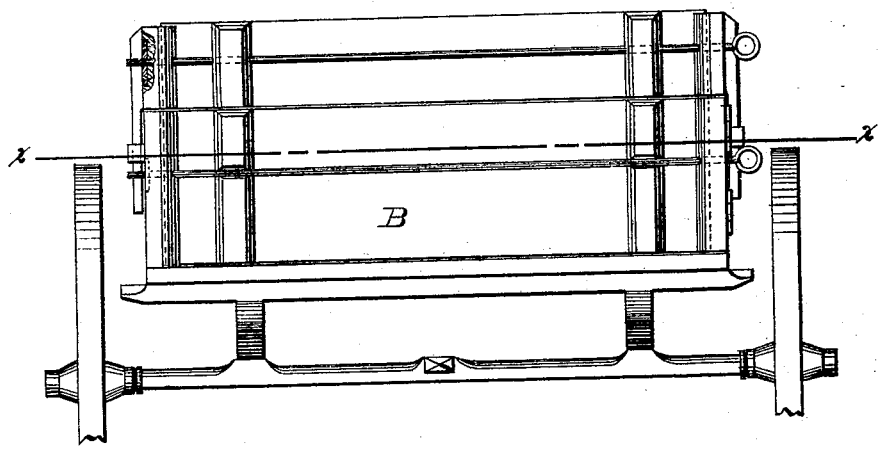
Figure 2:
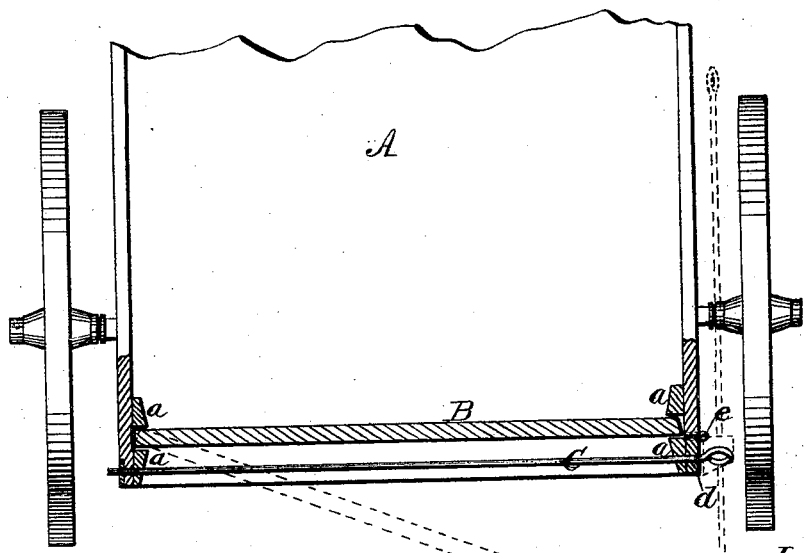

Figure 1 is a rear elevation of a wagon-body provided with our gate, and Fig. 2 a horizontal section of the same on the line $x$ $x$.

A represents the wagon box or body provided, as usual, with two cleats, $a$, on each of the inner sides at the rear end to hold the ends of the gate B, which is constructed in one solid piece, as usual, and has its ends inserted between the cleats. One side of the body has its extreme rear end $d$, to which one of the outside cleats is secured, hinged, as shown at $e$, so that it may be turned outward, as shown in dotted lines, and the end of the gate thereby released, so that it may be drawn back and removed. An ordinary rod C, such as is used across the end of all wagon-bodies, is passed through the hinged portion of the side piece and screwed at its opposite end into the other side of the body, as shown in both figures. The rod thus arranged serves to hold the hinged portion inward, and thereby to keep the gate in place, while at the same time it also answers its usual purpose of holding the body from spreading. By unscrewing the end of the rod the hinged portion of the side is released, so that it can be turned back to release the gate. When the hinged part is turned back the rod can be pushed back through it between the wheel and the body, as shown in dotted lines in Fig. 1, in order to admit of the wagon being driven close to the side of a house or fence. The rod not only serves as a fastening for the hinged piece, but also as a handle by which the piece may be turned inward and outward with convenience.

The above method of securing the gate is extremely simple, cheap, and durable. It allows the gate to be inserted and removed with great ease and quickness under all circumstances, and it holds the gate securely, so that it can neither rattle nor work out of the body. Extra side and end boards, D, may be used on top of the body, as usual, without interfering with our gate, as it can be removed without removing the extra boards or gates above it.

We are aware that it is old to fasten one end of a wagon-gate by a cleat having its rear edge hinged to the inside of a wagon-body. These hinged cleats are, however, very objectionable, on account of the difficulty experienced in turning them back in case the load presses the gate back strongly against them, and in case they expand when wet so as to crowd tightly against the gate. In practice it is frequently a matter of great difficulty to release them. They are also objectionable because it is necessary to provide them with special devices for turning them back and for fastening them. Our invention overcomes all these difficulties. By hinging the rear end of the body to which the cleat is attached, instead of hinging the cleat, we render it impossible for the cleat to wedge fast, and cause the pressure of the gate to turn the cleat back as soon as the hinged portion is released. We also use the ordinary tie-rod—which is always employed—as a means of fastening the hinged portion, and thus avoid the expense of extra fastening devices.

Having thus described our invention, what we claim, is—

1. The wagon-body A having the rear end $d$ of its side hinged to swing outward, and provided with the fixed cleat $a$, so that the pressure of the gate tends to turn it outward, as set forth.

2. In combination with the wagon-body, having its side $d$ hinged and provided with the cleat $a$, the rod C passing through and holding the hinged portion, as shown.

ROBERT SMILLIE.
CHARLES H. BROOKS.

Witnesses:
E. G. SPRAGUE,
L. D. HENDERSON.